(12) United States Patent
Morioka (10) Patent No.: US 7,539,152 B2
(45) Date of Patent: May 26, 2009

(54) SERVICE PROVIDING APPARATUS, SERVICE PROVIDING METHOD, AND PROGRAM

(75) Inventor: Yasuhiro Morioka, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 777 days.

(21) Appl. No.: 11/151,439

(22) Filed: Jun. 14, 2005

(65) Prior Publication Data

US 2006/0067489 A1 Mar. 30, 2006

(30) Foreign Application Priority Data

Sep. 30, 2004 (JP) ............................. 2004-287958

(51) Int. Cl.
*H04L 12/28* (2006.01)
(52) U.S. Cl. ..................................... 370/255
(58) Field of Classification Search ................ 370/254, 370/255; 379/221.14
See application file for complete search history.

(56) References Cited

U.S. PATENT DOCUMENTS

| 2002/0035621 | A1 | 3/2002 | Zintel et al. | |
| 2003/0100962 | A1* | 5/2003 | Sumita et al. | 700/65 |

FOREIGN PATENT DOCUMENTS

| JP | 2002-73436 | 3/2002 |
| JP | 2004-248072 | 9/2004 |
| JP | 2004-252974 | 9/2004 |
| WO | WO 2004/051958 A2 | 6/2004 |

OTHER PUBLICATIONS

Hiroyuki Morikawa, et al., "STONE: Context-aware Network Service Architecture", IEICE-IN2001-12, May 2001, 8 Pages.
Tomoko Itao, "DANSE: Dynamically Adaptive Networking Service Environment", The Transactions of the Institute of Electronics, Information and Communication Engineers, B, Japan, The Institute of Electronics, Information and Communication Engineers, vol. J82-B, No. 5, May 25, 1999, pp. 730-739 (plus two cover pages).

* cited by examiner

*Primary Examiner*—Chirag G Shah
*Assistant Examiner*—Yong Zhou
(74) *Attorney, Agent, or Firm*—Oblon, Spivak, McClelland, Maier & Neustadt, P.C.

(57) ABSTRACT

A service providing apparatus which advertises first service description on a network and which provides a first service associated with the first service description. A definition table is prepared to define a condition on which a function of the first service is extended utilizing a second service associated with second service description and a method of calling the second service. The second service which satisfies the condition is searched for referring to the definition table, and the first service description is updated based on the second service description associated with the searched second service. Moreover, the service description is advertised on the network. The second service is called in response to a service request based on the service description of the advertised first service, and a response from the second service is received. A response to the service request is generated based on the response from the received second service.

7 Claims, 9 Drawing Sheets

| urn:schemas-upnp-org:<br>ContentDirectory:1.0 | urn:schemas-upnp-org:<br>ContentDirectory1 | Browse |
|---|---|---|
| | requireAs(a, urn:schemas-upnp-org:TranslateService:1.0)<br>&& hasAction(a, "Translate")<br>&& oneOf(getAvailableValieList(a, "Translate", "outputLanguage"))<br>== "Chinese"  <br><br>local.Browse(objID, browseType, filter, result, sortCriteria)<br>if (AcceptLanguage(request) == "Chinese"){<br>   result = a.Translate("default", "Chinese", result, outStr)<br>   result = outStr<br>   return<br>} else {<br>   // do default.<br>} | |

F I G. 9

| urn:schemas-upnp-org:<br>DiskManageService:1.0 | urn:schemas-upnp-org:<br>DiskManageService1 | GetFreeSize |
|---|---|---|
| | requireAs(a, urn:schemas-upnp-org:DiskServiceTranslateService:1.0)<br>&& hasAction(a, "GetFreeSize") | sum = local.GetFreeSize()<br>foreach(s, services) {<br>  sum += s.GetFreeSize();<br>}<br>return sum |

F I G. 10

|   | urn:schemas-upnp-org:<br>TranslateService:1.0 | urn:schemas-upnp-org:<br>TranslateService1 | Translate |
|---|---|---|---|
| 1 | | uuid:C422BC28-117F-4d30-B443-59CA09130305 | |
|   | urn:schemas-upnp-org:<br>TranslateService:1.0 | urn:schemas-upnp-org:<br>TransrateService1 | Translate |
| 2 | | uuid:11546136-2956-4d4f-BFF7-AC3B11AECAAA | |
|   | urn:schemas-upnp-org:<br>TranslateService:1.0 | urn:schemas-upnp-org:<br>TransrateServiceA | Translate |

FIG. 11

SERVICE PROVIDING APPARATUS, SERVICE PROVIDING METHOD, AND PROGRAM

CROSS-REFERENCE TO RELATED APPLICATIONS

This application is based upon and claims the benefit of priority from prior Japanese Patent Application No. 2004-287958, filed Sep. 30, 2004, the entire contents of which are incorporated herein by reference.

BACKGROUND OF THE INVENTION

1. Field of the Invention

The present invention relates to a network technique, a service providing apparatus which dynamically configures and provides service in universal plug and play (UPnP), a service providing method, and program.

2. Description of the Related Art

A technique for connecting each audio apparatus, a video apparatus, or another household electric appliance via a network and mutually utilizing them has rapidly advanced. A certain common communication procedure is required among apparatuses so that a certain apparatus constituting the network is capable of operating the other apparatus via the network. As one procedure, Universal Plug and Play (UPnP) protocol is known. The UPnP consists of some internet standard technologies such as: AutoIP (automatic assignment of IP address); simple service discovery protocol (SSDP: finding of target apparatus); hyper text markup language (HTTP: transmission/reception of hyper text); XML (description of apparatus information and service); simple object access protocol (SOAP: calling of apparatus service); and generic event notification architecture (GENA: event notification of apparatus state) (see, e.g., U.S. Pat. Laid-Open No. 2002/0035621).

A UPnP device or service is defined as an application protocol, based on the UPnP core protocol, described in above. An apparatus is described as a combination of UPnP devices and UPnP services, and the UPnP devices and services are published on the network. A UPnP control point finds the UPnP device. The UPnP control point calls any function of the UPnP service, and receives event notification from the UPnP service.

Roles of the UPnP device and the UPnP control point are statically assigned based on an assumption beforehand. However, the function of the UPnP device and service published is restricted by a capability of the apparatus itself, and it is not assumed that the capability of the apparatus changes during the operation. A framework for UPnP is not prepared in which the changes is notified to a UPnP control point, when the capability of the UPnP device and service is modified.

In the UPnP, there is a problem that there is not any framework for dynamic function expansion. But, as a framework other than the UPnP, a technique for making possible a dynamic service configuration is described in "STONE: Environment Adaptive Network Service Architecture, Technical Research Report of the Institute of Electronics, Information, and Communication Engineers, IN2001-12, May 2001". In the technique described in this document, dependence of the respective functions is represented as a graph, an apparatus which provides each function is searched for, and the functions are dynamically bonded. However, in the technique described in the above-described document, it is assumed that the apparatus operates in a large-scaled computer network, a unique protocol for constructing a virtual network for cooperation among the apparatuses is introduced, and the existing protocol or apparatus is replaced.

Several problems lie in providing a mechanism which newly makes possible the dynamic service configuration without replacing the existing protocol in the framework of the UPnP. One problem lies in combination of the functions to be found for constructing a new service, and another problem lies in publication of the service. There is a further problem that the service is to be maintained to be stable.

As to a method of constructing and publishing the service, the UPnP device itself does not have a capability for searching another UPnP device and a capability for calling the UPnP service. Therefore, there is not any framework for extending the function of the UPnP device with regard to of the presence of other UPnP devices.

Moreover, how to notify the changes of the service is not explicitly determined in the UPnP specification. The UPnP device is once ended, and restarted, accordingly ssdp:byebye is notified to UPnP control points, the device is recognized again, and further event subscription registration can be cleared. However, the ending with ssdp:byebye indicates that all the functions provided by the UPnP device end. The apparatus utilizing the function which does not influence the updated service discontinues or fails halfway in the process. Therefore, the apparatus using a function which is not related is preferably capable of continuously using the function as in a conventional technique.

BRIEF SUMMARY OF THE INVENTION

The present invention is directed to provide a service providing apparatus, method, and program capable of dynamically configuring a service, extending a function, and providing the service.

According to one aspect of the present invention, there is provided a service providing apparatus which advertises first service description on a network and which provides a first service associated with the first service description, a definition table is prepared to define a condition on which a function of the first service is extended utilizing a second service associated with second service description and a method of calling the second service. The second service which satisfies the condition is searched for referring to the definition table, and the first service description is updated based on the second service description associated with the searched second service. Moreover, the service description is advertised on the network. The second service is called in response to a service request based on the service description of the advertised first service. A final response to the service request is generated based on the response from the second service.

DETAILED DESCRIPTION OF THE INVENTION

An embodiment of the present invention will be described hereinafter with reference to the drawings.

Figure 1:
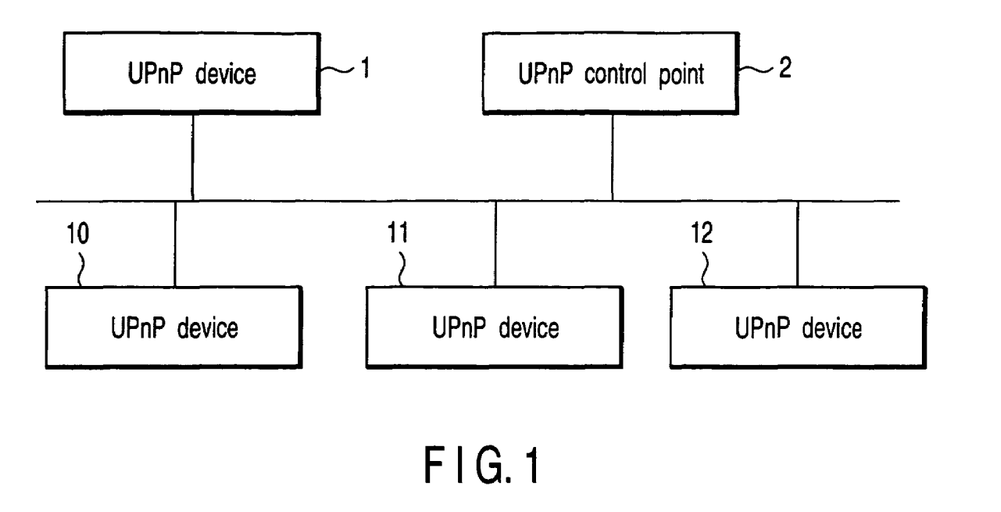
FIG. 1 is a block diagram showing one example of a UPnP network according to one embodiment of the present invention.

FIG. 1 is a block diagram showing a UPnP network according to one embodiment of the present invention. The present network comprises a UPnP device 1, UPnP control point 2, and a plurality of UPnP devices 10, 11, 12. The UPnP device 1 corresponds to a service publication device to which the present invention is applied, and the UPnP control point 2 and the UPnP devices 10, 11, 12 are existing. It should be noted that the present embodiment will be described assuming that "providing" of a service has the same meaning as that of "publishing" of the service.

The UPnP control point 2 corresponds to a client apparatus which controls the UPnP device. The control point is realized as, for example, a personal computer, a personal digital assistant and so on. The control point has a configuration (not shown) in which a central processing unit (CPU) for performing a calculation process such as control, a process block for display, a process block for operation input, a storage block of process contents, and a communication process block with respect to another apparatus are connected to an internal bus.

The UPnP device 1 corresponds to a server apparatus controlled by the UPnP control point, and can be realized as a computer in the same manner as in the UPnP control point. A program for realizing the function according to the present invention is stored in a program storage device (not shown). The program storage device comprises, for example, a magnetic disk drive, an optical disk drive and the like. The program is read in a random access memory (RAM) by control from the CPU. When the program is executed by the CPU, the computer can be functioned as a UPnP device (service publication device) according to the present invention. It should be noted that an operating system for managing various computer resources, and providing a file system, network communication function, graphical user interface (GUI) and the like is also introduced into the UPnP device 1.

Figure 2:
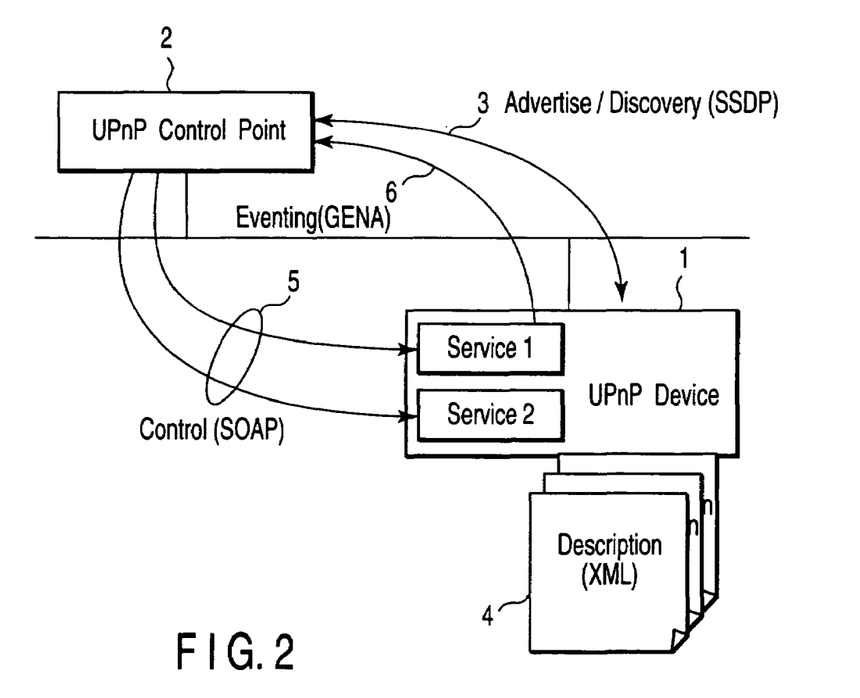
FIG. 2 is a diagram schematically showing an operation between a UPnP device and a UPnP control point.

An operation between the UPnP device and the UPnP control point will be schematically described with reference to FIG. 2. The UPnP device 1 advertises presence of itself toward the UPnP control point 2 in accordance with an SSDP 3, and also advertises device and service descriptions 4 described in an XML form. The UPnP control point 2 discovers the UPnP device 1 and services 1, 2 in accordance with the SSDP 3, and controls actions of the respective services 1, 2 by a call 5 based on SOAP. A state change of the UPnP service is notified to the UPnP control point 2 which subscribes event notification 6 based on GENA. This basic operation also applies to the existing UPnP devices 10 to 12.

Figure 3:
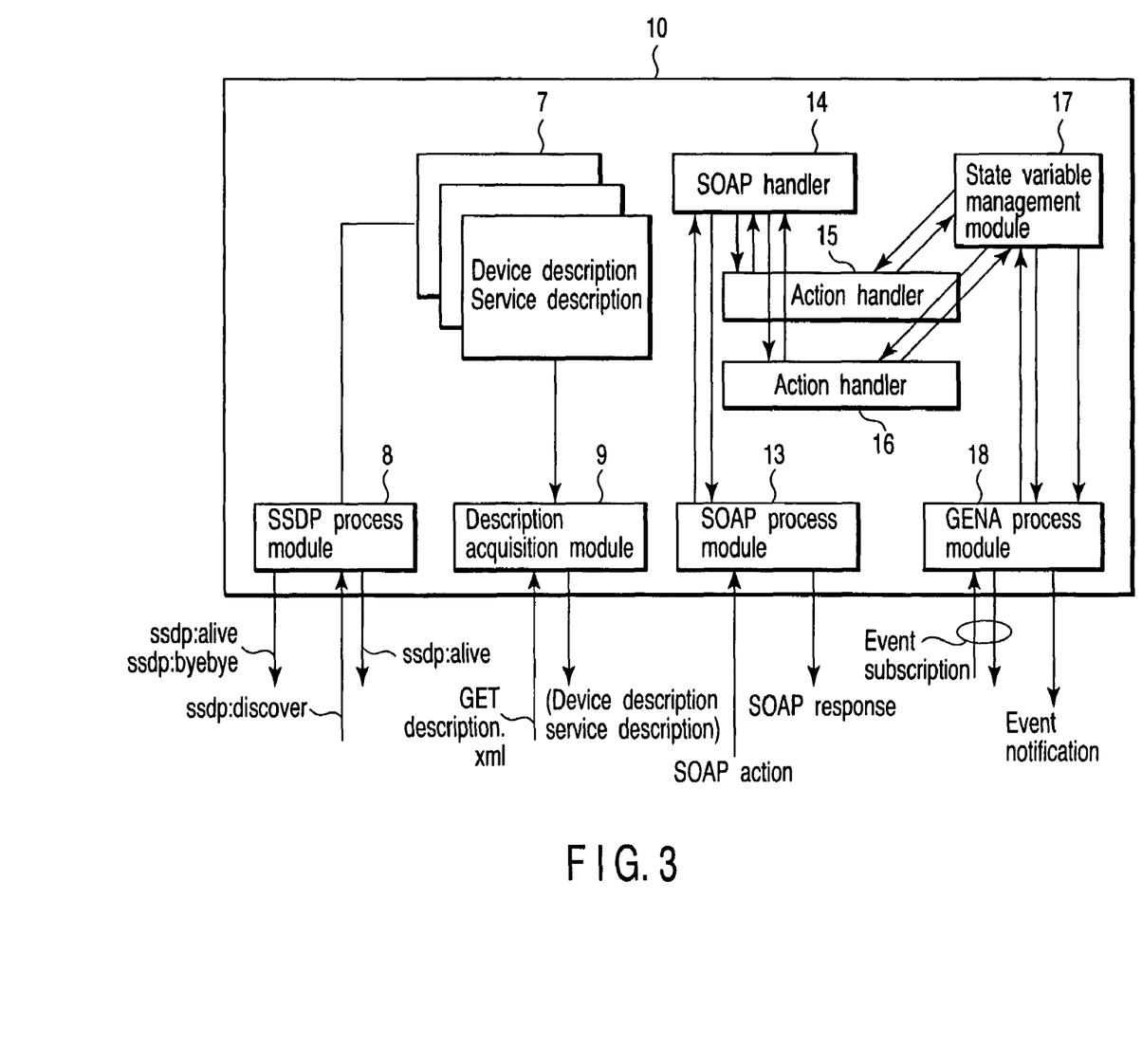
FIG. 3 is a diagram showing a software configuration of the existing UPnP device.

FIG. 3 is a diagram showing a software configuration of the existing UPnP device. For example, a list of functions published by the existing UPnP device 10 is statically prepared as device and service descriptions 7, and a UPnP device type, device ID, service type and the like are advertised through an SSDP process module 8. The UPnP control point 2 selects a required service or device based on advertised information, and performs an acquisition request of the device and service descriptions 7 by HTTP. A description acquisition module 9 transmits the device and service descriptions 7 described in an XML form to the UPnP control point 2 in response to an acquisition request.

Each service function is usable as an action of each UPnP service via SOAP. An action request from the UPnP control point 2 is transferred to handlers 15, 16 of each action from an SOAP process module 13 through an SOAP handler 14. These handlers 15, 16 perform actual processes referring to UPnP state variables, return responses in accordance with process results, and update the UPnP state variables. A state variable management module 17 which manages the UPnP state variables performs event notification with respect to the UPnP control point 2 which is a subscription end through a GENA process module 18, when the updated state variable is an object of the event notification.

Figure 4:
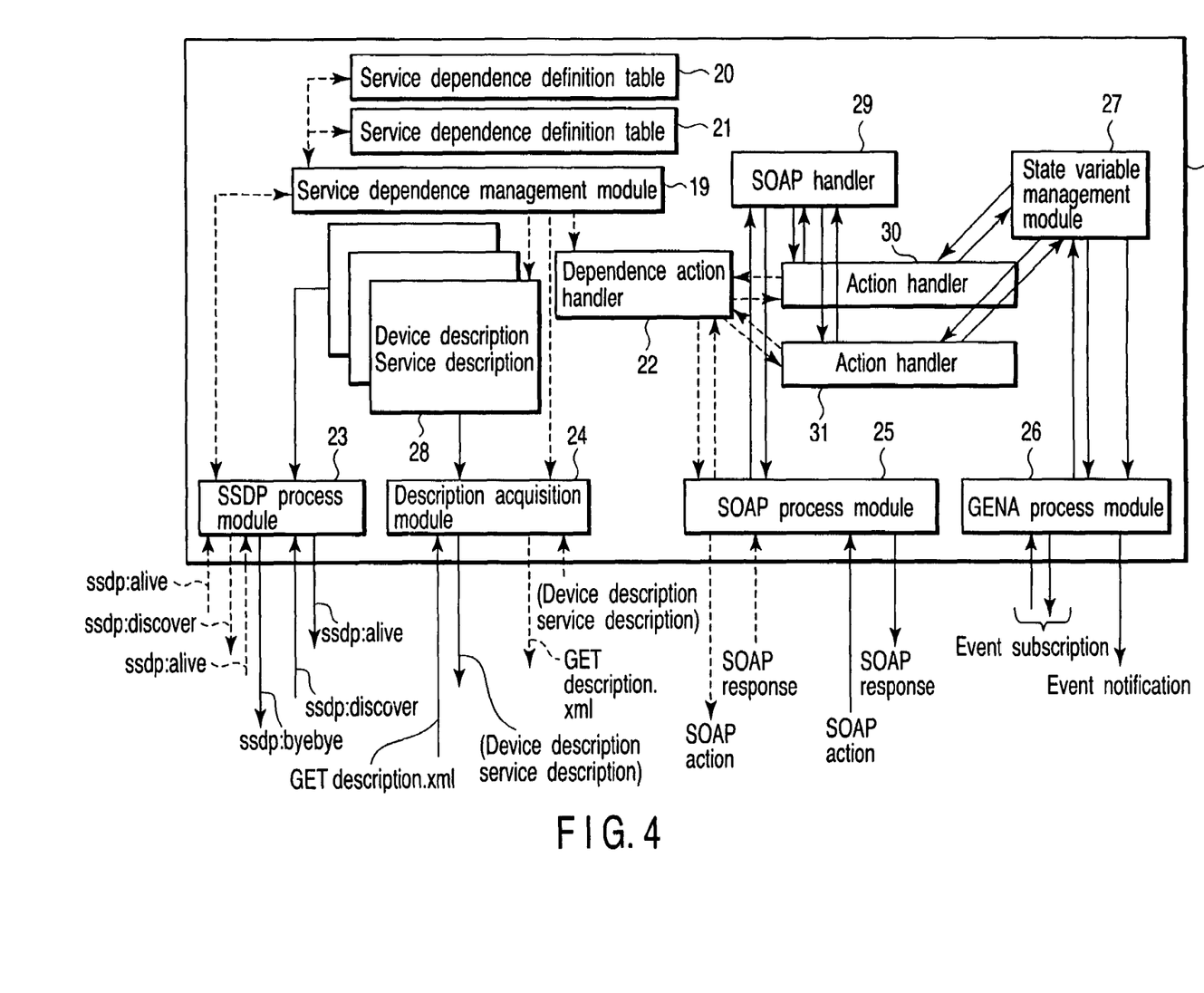
FIG. 4 is a diagram showing a software configuration of the UPnP device which is a service publication device according to an embodiment of the present invention.

FIG. 4 shows a software configuration of the UPnP device which is a service publication device according to an embodiment of the present invention. As compared with FIG. 3, a service dependence management module 19, a service dependence definition table 20, a service dependence table 21, and a dependence action handler 22 are added. It should be noted that an SSDP process module 23, a description acquisition module 24, an SOAP process module 25, and a GENA process module 26 also perform an operation of the UPnP control point in addition to the operation of the UPnP device.

The service dependence management module 19 enumerates a peripheral UPnP service adapted to a condition indicated by the service dependence definition table 20 through the SSDP process module 23. The module acquires device and service descriptions of a peripheral UPnP device to update the service dependence table 21 through the description acquisition module 24. Accordingly, the module also updates a corresponding device and service descriptions 28. The updated device and service descriptions 28 are advertised to the peripheral UPnP control point 2.

The dependence action handler 22 cooperates with the service dependence management module 19 to select and call the action of the peripheral UPnP service.

Each of action handlers 30, 31 is capable of calling the action of the peripheral UPnP service through the dependence action handler 22 in addition to each contained service. From the service dependence definition table 20, and a list of actions which are stored in the service dependence table 21 and which can be called, it is determined whether or not to actually call the action of the peripheral UPnP service.

That is, the function of each service is called as each action of the UPnP service, and a handler function corresponding to the action is called inside. Since an action published by another peripheral UPnP device and service is called in a handler function through the dependence action handler 22, cooperation can be realized between the UPnP devices. When this is viewed from a UPnP control point 2 side, the action is published as one service. Therefore, a combined use of high-functional services is possible without increasing a burden of the UPnP control point 2.

Figure 5:
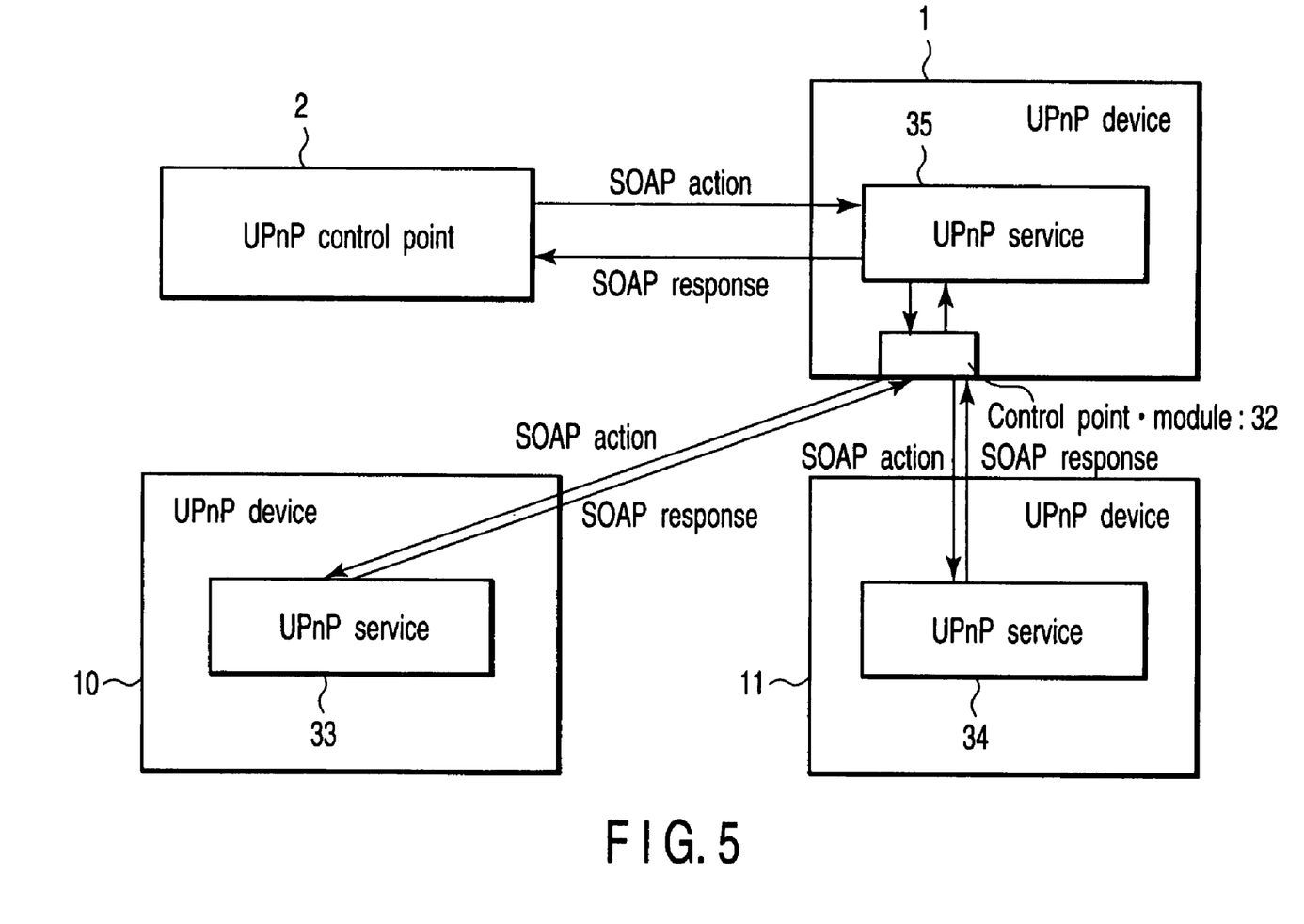
FIG. 5 is a diagram showing the UPnP device, UPnP service, and UPnP control point in accordance with roles.

FIG. 5 shows the UPnP device, UPnP service, and UPnP control point in accordance with roles. A UPnP device 1 behaves as a UPnP control point with respect to peripheral UPnP devices 10, 11 by a control point module 32. The control point module 32 enumerates and selects the peripheral UPnP services 33, 34, calls the action, and allows UPnP services 33, 34 to execute some of actions requested from the original UPnP control point 2. Accordingly, a UPnP service 35 can be strengthened by capabilities provided by the peripheral UPnP services 33, 34.

Figure 6:
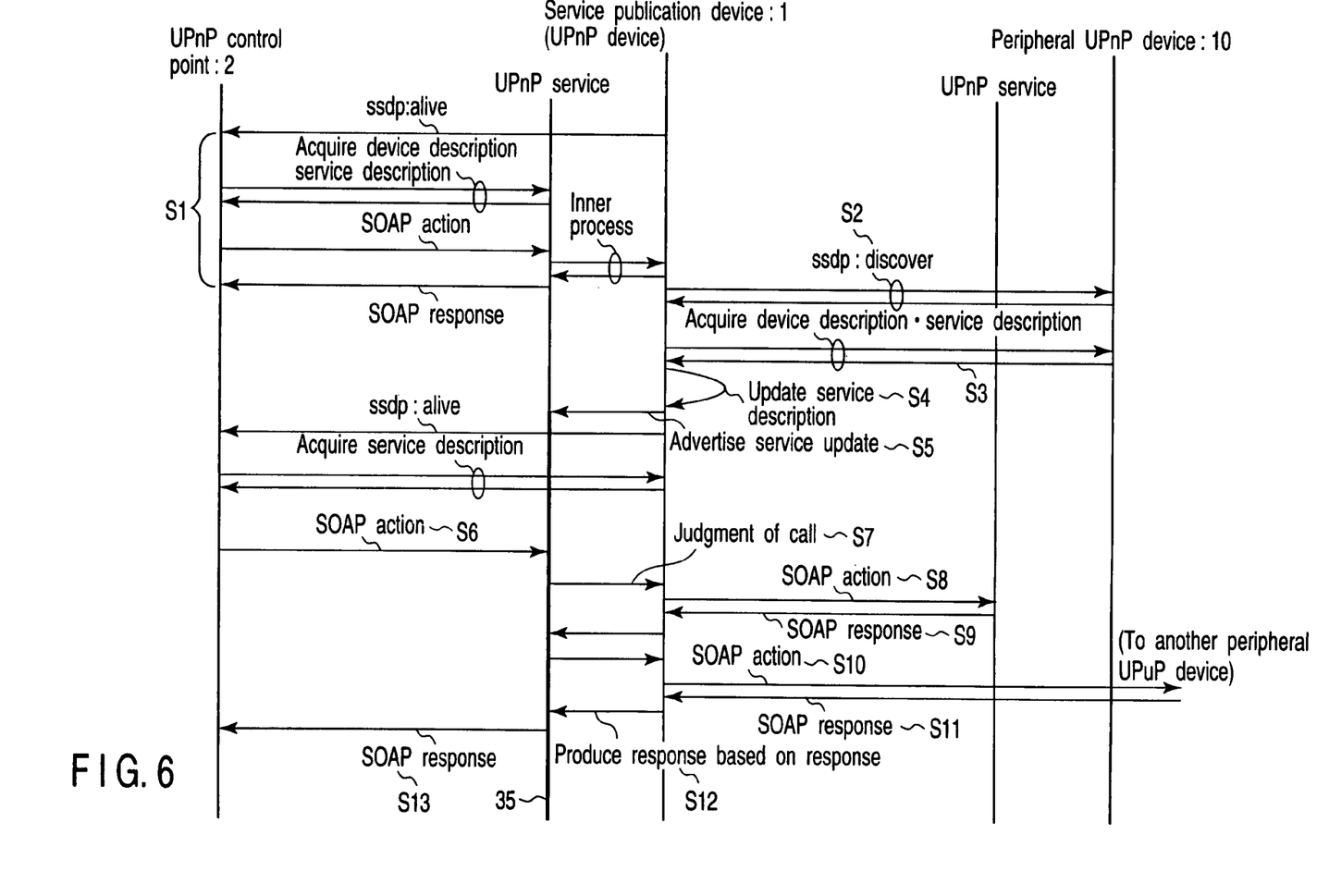
FIG. 6 is a sequence diagram showing a procedure in which the service is executed in the UPnP network according to one embodiment of the present invention.

FIG. 6 is a sequence diagram showing a procedure in which the service is executed in the UPnP network according to one embodiment of the present invention.

First, the UPnP device 1 responds to a request from the UPnP control point as the existing UPnP device and UPnP service (step S1). In parallel with this, the following steps are executed periodically or based on advertisement of the peripheral UPnP device. The UPnP device 1 searches (ssdp: discover) the peripheral UPnP device by SSDP (step S2). Here, all the UPnP devices 10, 11, 12 are discovered as peripheral UPnP devices around the UPnP device 1, and the UPnP devices 11, 12 are shown together as "other peripheral UPnP devices" in the sequence diagram.

The UPnP device 1 obtains device and service descriptions from the peripheral UPnP device. Moreover, the device acquires the device and service descriptions of the peripheral UPnP device, which are adapted to the condition indicated by the service dependence definition table 20, to update the service dependence table 21 (step S3). Accordingly, the device also updates the corresponding device and service descriptions 28 (step S4). The updated device and service descriptions 28 are advertised to the peripheral UPnP control point 2 (step S5). A reference numeral 35 in the figure shows an existence line of a new UPnP service synthesized and published according to the present invention based on the peripheral UPnP device and UPnP service.

Thereafter, when the UPnP device 1 is required to execute an action based on SOAP from the UPnP control point 2 (step S6), the device judges whether or not the action can be executed only by the UPnP device 1, or whether or not the discovered peripheral UPnP service is required (step S7). Here, it is judged that the requested action requires the calling of the UPnP service of the peripheral UPnP device.

In a case where action execution of the peripheral UPnP service is required, the UPnP device 1 calls an action (SOAP action) of the peripheral UPnP service as the UPnP control point (steps S8, S10), and obtains a response (SOAP response) from the corresponding peripheral UPnP device (steps S9, S11). The UPnP device 1 builds a value to be returned to the UPnP control point 2 based on these received responses (step S12), and returns a final SOAP response (step S13).

Figure 7:
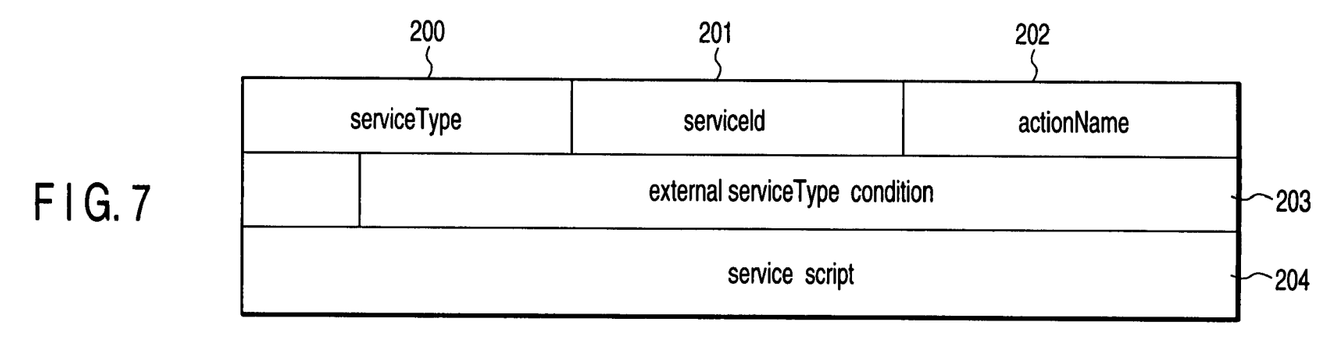
FIG. 7 is a diagram showing one example of a data format of a service dependence definition table.

FIG. 7 shows one example of a data format of a service dependence definition table. The service dependence definition table 20 defines at least a condition for extending a function utilizing the calling of (the action of) another service, and the method of calling the service. Specifically, one element (record) of the service dependence definition table 20 defines a peripheral service type condition (external serviceType condition) 203 indicating the condition of the UPnP service action in a range connectable (combinable) to the service, and a service script 204 which defines the method of calling the service with respect to a field set including a service type (serviceType) 200, a service ID (serviceId) 201, and an action name (actionName) 202. Specific examples of the element of the service dependence definition table 20 are shown in FIGS. 8, 9, 10.

Figure 8:
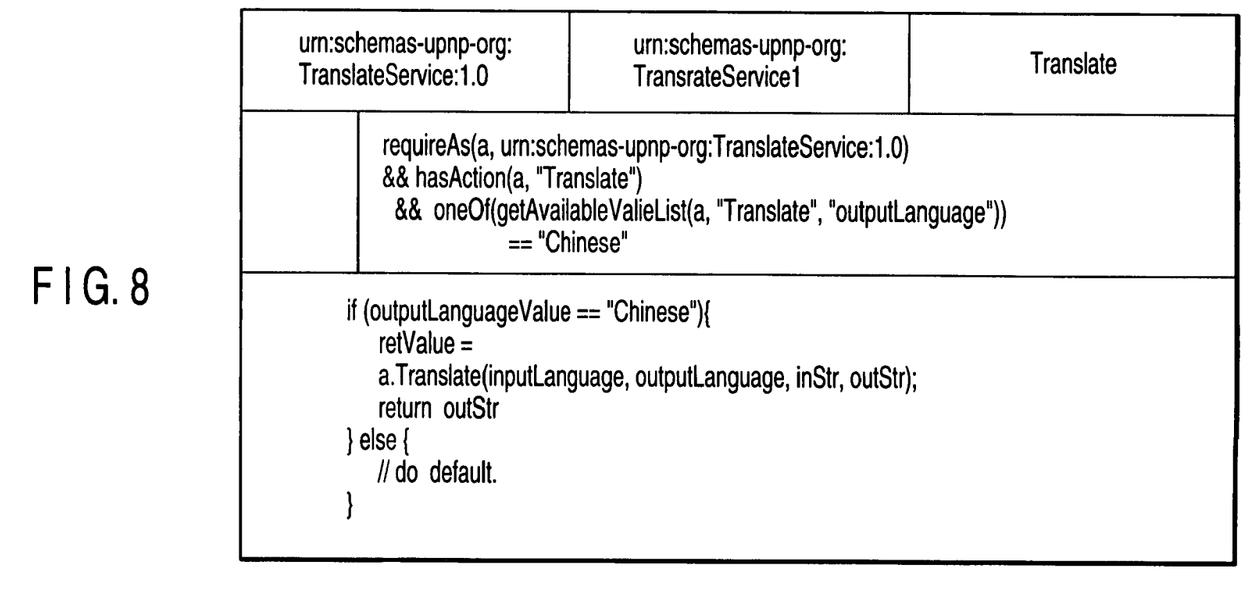
FIG. 8 is a diagram showing a specific example of an element of the service dependence definition table.

According to a specific example shown in FIG. 8, the condition of the peripheral UPnP service (action) connectable to a translate action of urn:schemas-upnp-org:TranslateService:1.0 service. That is, the condition is that the element has the urn:schemas-upnp-org:TranslateService:1.0 service, this service has a translate action, and "Chinese" is included in a value which can be taken by an outputLanguage argument of TranslateAction. The service calling method in a case where this condition is satisfied is as follows. That is, when "Chinese" is designated in the outputLanguage argument with respect to the calling of the translate action from the UPnP control point, the translate action of the corresponding peripheral UPnP service, or a contained translate action is called, and a returned value is assumed as the response to the translate action.

Figure 9:
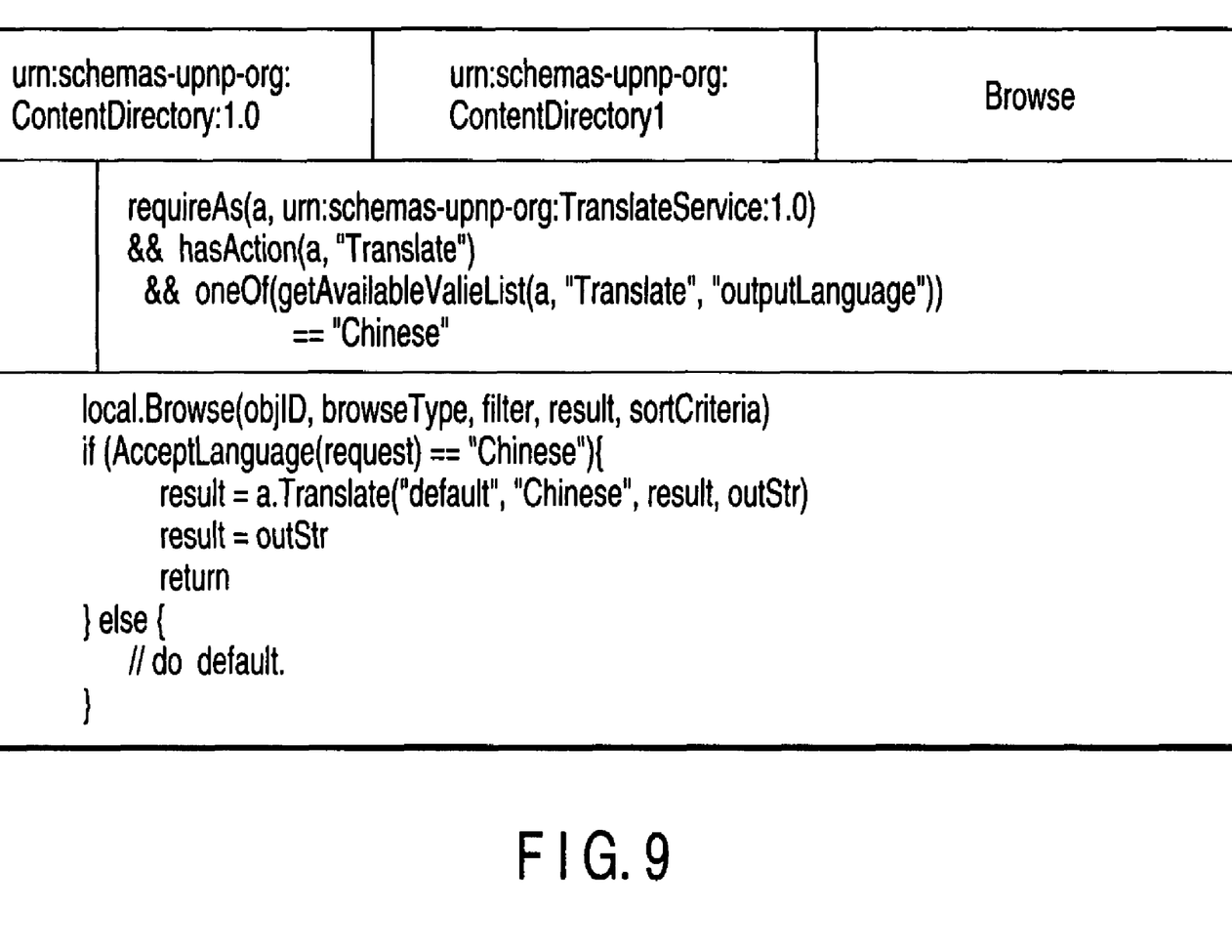
FIG. 9 is a diagram showing a specific example of the element of the service dependence definition table.
Figure 10:
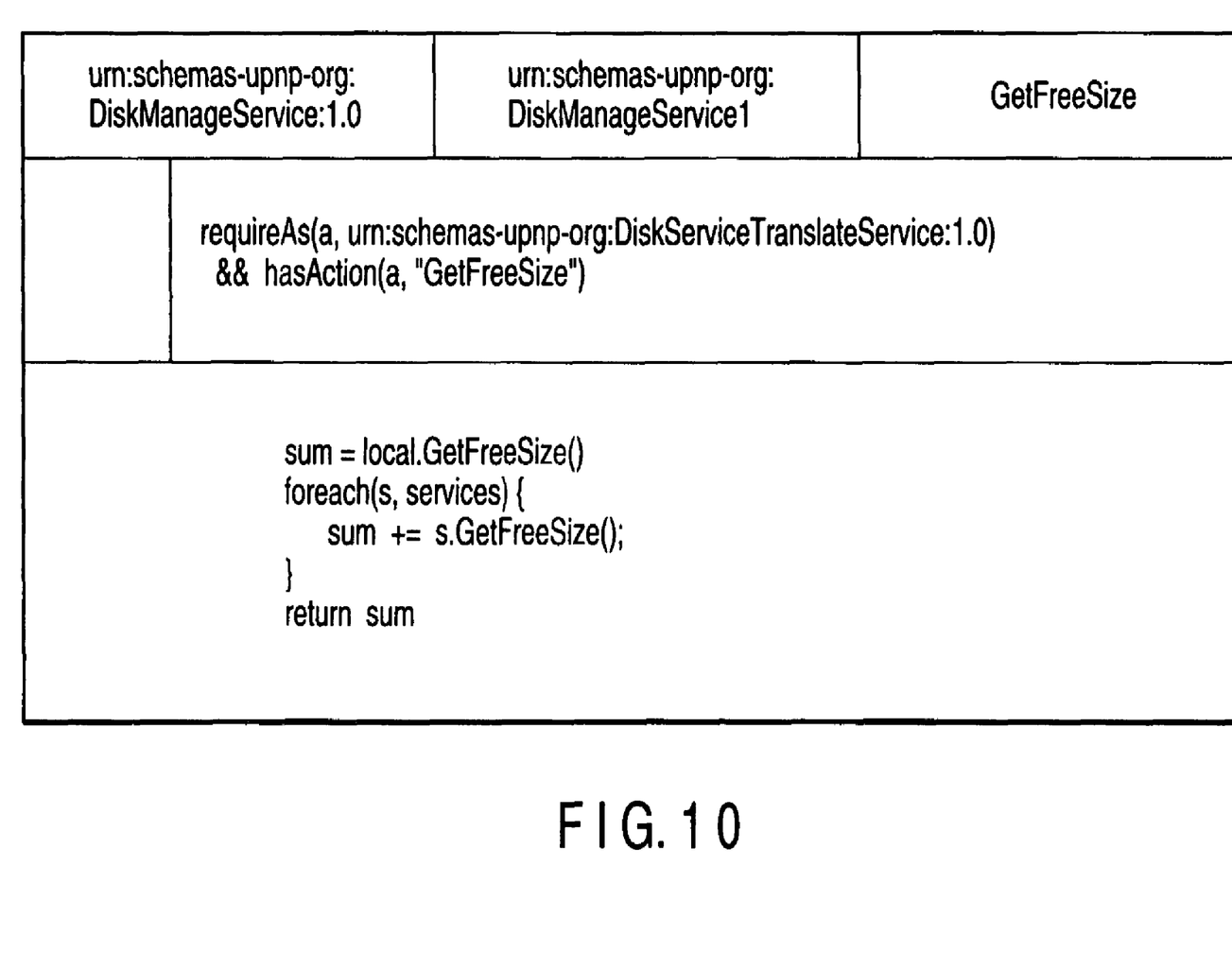
FIG. 10 is a diagram showing a specific example of the element of the service dependence definition table.

In a specific example shown in FIG. 9, the service type of the required peripheral UPnP service is different from that of a first called action. A condition of the peripheral UPnP service connectable to a browse action of urn:schemas-upnp-org:ContentDirectory:1.0 service is as follows. That is, the element has urn:schemas-upnp-org:TranslateService:1.0 service, the service has a translate action, and "Chinese" is included in a value which can be taken by an outputLanguage argument of TranslateAction. A service calling method in a case where this condition is satisfied is as follows. That is, first the browse action is executed. Next, if Accept-Language of an HTTP header carrying the browse action from the UPnP control point is "Chinese", the translate action is executed, and an output outStr is obtained as a new result. For example, assuming that Translate (default, "Chinese", inStr, outStr) is an action to translate an original sentence indicated by inStr in Chinese and write the sentence into outStr, the result included in the response of the browse action by the UPnP control point is obtained by the content translated in Chinese.

In a specific example shown in FIG. 10, a condition of the service connectable to a GetFreeSize action of urn:schemas-upnp-org:DiskManageService:1.0 is as follows. That is, the element has urn:schemas-upnp--org:DiskManageService1.0, and the service has the GetFreeSize action. At this time, a total sum of a return value by the GetFreeSize action (local.GetFreeSize( )) of its own apparatus, and a return value of a GetFreeSize action (s.GetFreeSize( )) of each corresponding UPnP service with respect to the calling of the GetFreeSize action from the UPnP control point is assumed as a response to the GetFreeSize action.

Figure 11:
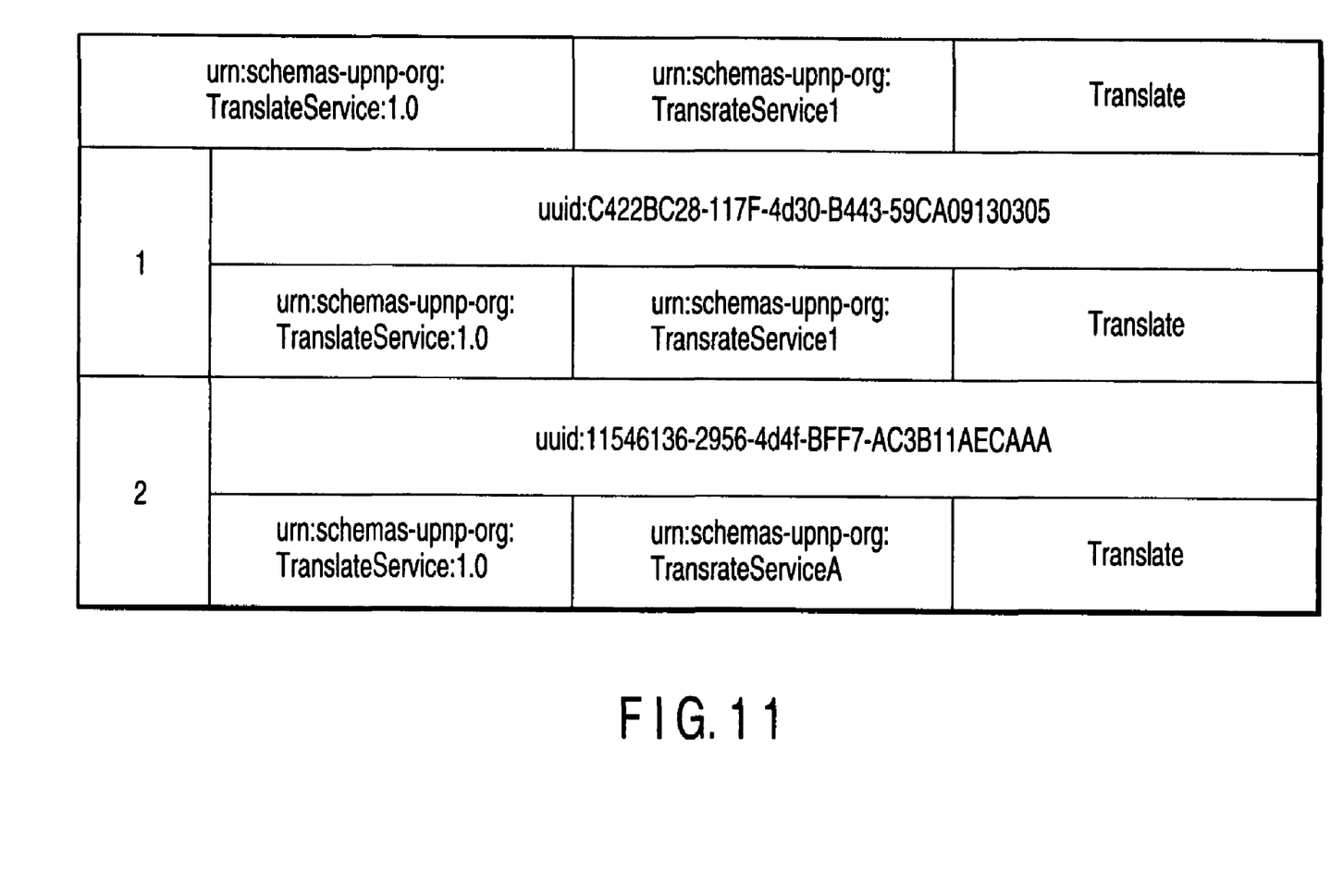
FIG. 11 is a diagram showing one example of the service dependence definition table.

FIG. 11 is a diagram showing one example of a peripheral UPnP service list searched based on the service dependence definition table of FIG. 8. Arrangement of the searched peripheral UPnP services for each action corresponds to the service dependence table 21. Here, two services are discovered which satisfy the peripheral service type condition (external serviceType condition), and UDNs of the UPnP devices which provide the respective UPnP services are "uuid:C422BC28-117F-4d30-B443-59CA09130305" and "uuid:11546136-2956-4d4f-BFF7-AC3B11AECAAA", respectively. Needless to say, they change in accordance with operation start or stop of the peripheral UPnP service.

As described above, when at least some of the UPnP services published by the peripheral UPnP device is taken in, the function of the UPnP service published by the UPnP device 1 can be extended. In this case, the change of the service published by the UPnP device 1 needs to be notified to the peripheral UPnP control points.

Here, it is not assumed that the service published during the operation of the UPnP device dynamically changes in conventional UPnP specifications, and a framework to notify the new published service at a publication time is not provided. Accordingly, there is an assumption that a manner in which the operation of the UPnP device is once ended and resumed is adopted as follows.

(1) The operation of the UPnP device is stopped. With respect to a device ID, device type, service type, and service ID to be published, ssdp:byebye is multicast in the periphery, and stop of the service is notified.

(2) Device and service descriptions concerning the service to be published are changed or updated.

(3) The operation of the UPnP device is resumed. Here, with respect to the device ID, device type, service type, and service ID to be published, ssdp:alive is multicast in the periphery, and it is notified that a new service is being operated.

The following procedure is adopted in a case where the present invention is follows (UPnP device 1).

(1) The service description of the service in which a change is generated in a content to be published is changed.

(2) ssdp:alive of the service is multicast to the periphery, setting a value of CACHE-CONTROL header to max-age=0.

Usually in the UPnP control point 2 which responds to the multicast, on receiving an ssdp:alive packet to which a header having a non-zero value such as CACHE-CONTROL: max-age=600 has been given, a content advertised by ssdp:alive is cached for a predetermined time (600 seconds in this case). It is necessary to advertise the next ssdp:alive packet, or to perform searching by an ssdp:discover packet from the UPnP control point 2 side before reaching a cache time limit. In a case where the present invention is followed, on receiving ssdp:alive CACHE-CONTROL: max-age=0, an internal cache disposed with respect to the service is cleared. Therefore, the service description of the service has to be acquired again. Time indicated by a Last-Modified header included in a response of HTTP-GET, which is a time stamp of the acquired service description, is different from time which has heretofore been obtained. Therefore, it can be judged that the conventional service description has been changed.

In this procedure, it is assumed that behavior of the UPnP control point 2 based on CACHE-CONTROL is cooperative. Considering storage of the UPnP control point more faithful to UPnP specifications, the following procedure is executed, and temporary stop, change, and restart of the only service in which the change has been caused are preferably performed.

(1) ssdp:byebye (stop) of the service in which the content to be published is changed is multicast in the periphery.

(2) Service description of the service is changed.

(3) ssdp:alive (start) of the above-described service is multicast in the periphery.

The number of packets increases as compared with the above-described method, but it is expected that the service change can be more securely advertised. At this time, since the service being utilized once ends in the UPnP control point 2, it can be judged that the procedure being called fails, and subscription of event notification is cancelled. Thereafter, since the service is restarted, the service description is requested to be acquired again. Time indicated by a Last-Modified header included in a response of HTTP-GET, which is a time stamp of the acquired service description, is different from time which has heretofore been obtained. Therefore, it can be judged that the conventional service description has been changed.

In this method, the service which is not changed can be simply continued as compared with a case where all services are ended in the UPnP device as in a conventional technique. Therefore, not only the number of multicast packets for notifying the service but also packets required for executing a re-subscription procedure of event notification can be reduced.

For example, it is assumed that one device has m services, and the event notification is subscribed from n control points with respect to each service. In this case, three ssdp announcements (UPnP route device, UPnP device type, UPnP device ID) are performed per UPnP device, and one announcement (UPnP service type) needs to be performed with respect to one UPnP service.

In this case, the number of a series of packets is (3+m)+(3+m)+(1+m)×n×2+m×n×2 based on the specifications of the UPnP. Here, a first term indicates transmission of ssdp:byebye, a second term indicates transmission of ssdp:alive, a third term indicates acquisition of device and service descriptions, and a fourth term indicates the number of packets required for each event notification subscription. Assuming that only one service is updated, the number of the packets is 1+1+n×2+n×2 in a case where the present invention is followed. Here, meanings of the first to fourth terms are the same as those described above. Therefore, a difference, 4+2×m+2×n×(2×m−1) packets can be omitted.

It should be noted that in a case where services are increased/decreased, the device description needs to be changed, and the update of the device is notified in a procedure similar to the above-described procedure. Additionally, in a case where the latter method is used, the device and all services are temporarily stopped, and resumed in the same manner as in a conventional method. This is based on compatibility with respect to the conventional method by the expansion from the conventional method.

In a case where the function of the service of the UPnP device is extended according to the present invention, the device and service descriptions need to be updated. However, in a case where the peripheral UPnP device or the peripheral UPnP service required for the expansion is stopped, the device and service descriptions need to be updated and advertised again.

Here, considering a case where the peripheral UPnP device frequently appears and is detached, and accordingly the UPnP device and service descriptions are frequently updated and advertised, the UPnP control point needs to constantly handle the update of the UPnP device and service descriptions. In this case, a large burden is applied to the UPnP control point, and a content of action calling needs to be adjusted in accordance with the change of the device and service descriptions. Therefore, frequency of the update of the UPnP device and service descriptions by the UPnP control point, and the frequency of the advertisement are preferably minimized.

To solve the problem, in the present embodiment, the following procedure is executed in parallel with other procedures. When actual function calling is performed in this state, the service to be published by the required peripheral UPnP device is searched and called, although an advertising function remains to be extended.

(1) ssdp:byebye notification of the peripheral UPnP device and service is received.

(2) The UPnP device and service having a corresponding service type is found. Here, already ssdp:alive advertised UPnP device and service is first searched. A peripheral UPnP device and service discover procedure by ssdp:discover is executed.

(3) A calling destination is switched to the service in a case where the corresponding service is found.

(4) Update and advertisement of the UPnP device and service are withheld until a certain time elapses, or a predetermined condition is satisfied in a case where the corresponding service is not found. Here, the calling of the corresponding peripheral UPnP device and service fails.

It should be noted that in a case where the corresponding service or action cannot be completely covered in step 2 described above (all actions cannot be substituted, or the range of values which can be taken by the argument of the action is small), it is judged that the service and action are not found, and step 4 may be executed. Alternatively, step 3 may be repeated until the service update and advertisement are executed in step 4 as long as the action can be substituted.

In the embodiment, the operation corresponding to the appearance or detachment of the peripheral UPnP device and service during the operation of the UPnP device 1 (service publication device) has been described above. However, even in a case where the operation of the UPnP device 1 is once stopped and resumed, the extended UPnP service may be advertised. In this case, it is considered that the peripheral UPnP device or service required in calling the action of the extended UPnP service is not found in the same manner as described above. However, when there is a request from the UPnP control point 2, the peripheral UPnP device or service is first searched by a procedure similar to the above-described procedure, the found UPnP device or service is called, and a predetermined time elapses, or a predetermined condition is satisfied. Then, the device and service descriptions are actually updated in accordance with the present content, and advertised again. Accordingly, it can be published that a high-function service is provided immediately after starting the operation with respect to the UPnP control point 2.

Moreover, the predetermined condition can include "whether or not there has actually been a function call (i.e., action call) by the UPnP control point". That is, even if the required peripheral UPnP device or service is not found based on whether or not the UPnP control point 2 has actually called the function of the extended UPnP service, that is, action, or based on the frequency or finally called time, it is judged whether or not self-UPnP service description is simply maintained, or the self-UPnP service is changed to an original content, and re-advertised, and this is executed. Accordingly, the service description can be appropriately changed and advertised based on necessity of the actually extended function.

In association with the above-described embodiment, it is judged whether or not the peripheral UPnP service is called, or whether or not the device and service descriptions are updated and re-advertised based on whether or not the UPnP control point 2 has actually called the function of the extended UPnP service, that is, the action, or based on the frequency or the finally called time. For example, when the calling frequency does not reach the predetermined number of times, a flag for judgment may be set in such a manner that the function of the service is not extended even if the peripheral UPnP service of the corresponding service type is discovered from now on.

Moreover, in the above-described embodiment, the functions of the UPnP device and UPnP service which already exist and are operating are extended. However, in addition to the expansion of the already operating UPnP device and service, the UPnP device and the UPnP service which are published only in a case where all essential peripheral UPnP devices and services exist may be operated. That is, the service publication (advertisement of the service description) may be inhibited unless all the essential peripheral UPnP devices and services are searched. Thus, according to the embodiment of the present invention, it is possible not only to extend the function of the existing service but also to dynamically configure and publish a completely new service based on the combination of the existing service.

In conclusion, a UPnP device can search for another UPnP device and UPnP service as a UPnP control point. Accordingly, a mechanism can be realized which calls the other UPnP device and service to extend a function or a part of the function provided by the UPnP device and service.

Moreover, a series of communication between the UPnP device and UPnP control is based on the UPnP protocol. Any function is not extended, any new protocol is not introduced, and even the UPnP device that is not designed assuming cooperative use beforehand can be included in a cooperation object.

Furthermore, UPnP service advertisement is done over only with respect to a service whose providing function has changed. Accordingly, the number of packets required for the advertisement, and a service interruption time can be reduced as compared with a case where all UPnP service advertisements are done over with respect to all the UPnP devices and services.

What is claimed is:

1. A service providing apparatus which, when operating as a UPnP device, advertises first service description on a network and which provides a first service associated with the first service description in response to a request from a first UPnP control point, the apparatus comprising:

a definition table to define a condition on which a function of the first service is extended utilizing a second service associated with second service description and a method of calling the second service;

a searching module configured to search the network for the second service which satisfies the condition referring to the definition table;

an update module configured to update the first service description based on the second service description associated with the searched second service;

an advertising module configured to transmit a packet which indicates the first UPnP control point to acquire service description again, in order to advertise service description of the updated first service, targeting the first UPnP control point on the network;

a module configured to operate as a second UPnP control point and call the second service in accordance with the calling method, in response to a service request based on the service description of the advertised first service;

a module configured to receive a response from the called second service; and a module configured to generate a response to the service request based on the response from the received second service, wherein the packet includes an SSDP (Simple Service Discovery Protocol): alive packet in which a header portion is set so that an internal cache indicating information for the first service is cleared.

2. The service providing apparatus according to claim 1, wherein the advertising module is configured to multicast stop of the first service on the network, and thereafter multicast the service description of the first service updated by the update module on the network.

3. The service providing apparatus according to claim 1, comprising: a storage to store the service description of the first service updated by the update module, wherein the advertising module is configured to read out the service description stored in the storage at the time of the next operation to advertise the service description in the network.

4. A service providing method for advertising first service description on a network and providing a first service associated with the first service description in response to a request from a first UPnP control point, comprising:

preparing a definition table to define a condition on which a function of the first service is extended utilizing a second service associated with second service description and a method of calling the second service;

searching the network for the second service which satisfies the condition referring to the definition table;

updating the first service description based on the second service description associated with the searched second service;

transmitting a packet which indicates the first UPnP control point to acquire service description again, in order to advertise service description of the updated first service on the network;

operating as a second UPnP control point and calling the second service in accordance with the calling method, in response to a service request based on the service description of the advertised first service;

receiving a response from the called second service; and generating a response to the service request based on the response from the received second service, wherein the packet includes an SSDP (Simple Service Discovery Protocol): alive packet in which a header portion is set so that an internal cache indicating information for the first service is cleared.

5. The service providing method according to claim 4, wherein the advertising comprises: multicasting stop of the first service on the network, and thereafter multicasting the service description of the first service updated by the update step on the network.

6. The service providing method according to claim 4, comprising:

storing the service description of the updated first service in a storage; and reading out the service description stored in the storage at the time of the next operation to advertise the service description in the network.

7. A computer readable storage medium encoded with instructions which when executed by a computer cause a processor to execute a method for advertising first service description on a network and providing a first service associated with the first service description in response to a request from a first UPnP control point, the method comprising:

instructing a computer to store a definition table to define a condition on which a function of the first service is extended utilizing a second service associated with second service description and a method of calling the second service;

instructing the computer to search the network for the second service which satisfies the condition referring to the definition table;

instructing the computer to update the first service description based on the second service description associated with the searched second service;

instructing the computer to transmit a packet which indicates the first UPnP control point to acquire service description again, in order to advertise service description of the updated first service, targeting the first UPnP control point on the network;

instructing the computer to operate as a second UPnP control point and call the second service in accordance with the calling method, in response to a service request based on the service description of the advertised first service;

instructing the computer to receive a response from the called second service; and instructing the computer to generate a response to the service request based on the response from the received second services, wherein the packet includes an SSDP (Simple Service Discovery Protocol): alive packet in which a header portion is set so that an internal cache indicating information for the first service is cleared.

* * * * *